United States Patent
Ehrne

(10) Patent No.: US 6,873,479 B2
(45) Date of Patent: Mar. 29, 2005

(54) MOUNTING BRACKET FOR A CLEAR APERTURE OF THE BASE FACE OF A PRISM

(75) Inventor: Franklin D. Ehrne, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/426,257

(22) Filed: Apr. 30, 2003

(65) Prior Publication Data

US 2004/0218290 A1 Nov. 4, 2004

(51) Int. Cl.[7] .............................................. G02B 5/04
(52) U.S. Cl. ...................... 359/831; 359/832; 359/833
(58) Field of Search ................................ 359/831–837, 359/258, 439–495, 822

(56) References Cited

U.S. PATENT DOCUMENTS

| | | | |
|---|---|---|---|
| 3,848,973 A | | 11/1974 | Merz et al. |
| 4,319,804 A | * | 3/1982 | Lipkins ....................... 359/529 |
| 4,453,178 A | * | 6/1984 | Miyatake et al. ........... 348/780 |
| 4,571,028 A | | 2/1986 | Ziegler et al. |
| 5,153,752 A | * | 10/1992 | Kurematsu et al. ............ 349/9 |
| 5,221,998 A | * | 6/1993 | Sugahara ..................... 359/831 |
| 5,357,289 A | | 10/1994 | Konno et al. |
| 5,610,765 A | * | 3/1997 | Colucci ....................... 359/633 |
| 5,749,641 A | | 5/1998 | Brice et al. |
| 5,944,401 A | | 8/1999 | Murakami et al. |
| 6,010,221 A | | 1/2000 | Maki et al. |
| 6,141,150 A | | 10/2000 | Ushiyama et al. |
| 6,181,490 B1 | | 1/2001 | Wun et al. |

OTHER PUBLICATIONS

Handbook of Optomechanical Engineering; 1997, pp. 202–210.

* cited by examiner

Primary Examiner—Mohammad Sikder
(74) Attorney, Agent, or Firm—Nelson Adrian Blish

(57) ABSTRACT

A mounting bracket (40) for suspending a clear aperture of the base face of a prism (30) has a frame providing a horizontal support surface for allowing light to pass through the clear aperture of the suspended prism (30). First, second, and third support elements (44, 46) are spaced apart on the frame for supporting the base face of the prism (30), suspending the clear aperture. The second and third support elements (44) are peripheral to the clear aperture. The center of gravity of the prism (30), vertically projected, lies on or within the triangle formed by the first, second, and third support elements (44, 46).

17 Claims, 9 Drawing Sheets

MOUNTING BRACKET FOR A CLEAR APERTURE OF THE BASE FACE OF A PRISM

FIELD OF THE INVENTION

The present invention generally relates to apparatus and methods for mounting a prism in an optical apparatus and more particularly relates to a prism mounting apparatus and method for use in a high-energy illumination subsystem of an electronic color projection system.

BACKGROUND OF THE INVENTION

Initially introduced as small-scale imaging devices for business presentation markets, electronic color projectors have steadily improved in overall imaging capability and light output capacity. In order for electronic motion picture projectors to compete with conventional motion picture film projectors such as those used in theaters, however, a number of significant technical hurdles remain. Among these hurdles is the need for providing sufficient illumination for large-scale image projection applications.

The overall light path for electronic color projection can be considered as having three basic subsystems: an illumination subsystem for providing red, green and blue color light at sufficient brightness; a modulation subsystem comprising devices such as spatial light modulators for modulating each color light; and a projection subsystem for combining and projecting the modulated light towards a display screen. A key problem that must be resolved in design of the illumination subsystem of an electronic projector is providing sufficiently bright light for modulation and projection components.

Referring to FIG. 1a, there is shown an illumination apparatus 10 for providing, from a single white light source 20, red, green, and blue light for modulation. Light source 20, typically a xenon lamp or other high intensity white light source, provides light along an optical axis O through uniformizing optics 22, such as an integrating bar or lenslet array and directed by a lens 24 to a color separator prism 30. Color separator prism 30 may have the V-cube or V-prism configuration shown in FIG. 1a, as is disclosed in U.S. Pat. No. 5,944,401 (Murakami et al.) and U.S. Pat. No. 5,357,289 (Konno et al.) Color separator prism 30 may alternately be an X-cube or X-prism, a Philips prism, or similar device. Color separator prism 30 typically uses a set of dichroic coated surfaces on glued-together prism segments, S1, S2, and S3 for separating light into its component colors. Red light for modulation is then directed along red optical axis $O_r$, blue light along blue optical axis $O_b$, and green light along green optical axis $O_g$.

As can be readily appreciated from the block diagram of FIG. 1a, the role of color separator prism 30 requires handling high intensity light at its input and, therefore, of handling intense heat. Increasing the brightness of individual color channels necessitates increasing the overall brightness of light that must be handled by color separator prism 30. High-temperature glass sections have suitable coatings and are bonded together with optical adhesives. Mechanical drift and stresses from external mounting components can cause slight angular shifting of the dichroic surfaces within color separator prism 30, with negative effects such as color shading and light loss. For this reason, support components for mounting color separator prism 30 within a projector chassis must allow for heat-related factors and must be designed to minimize heat build-up and to minimize the effects of thermal expansion due to unwanted thermal containment of the mounting mechanics.

One conventional solution has been to make color separator prism 30 as large as possible, thereby spreading heat effects over a sizeable mass. However, this coarse approach prevents the design of more compact projection apparatus. Meanwhile, conventional prism mounting techniques for color separator prisms and other heat sensitive prism applications are characterized by mechanical complexity, over-constraint, crowding, and need for precision adjustment and allowance for heat effects. For example:

U.S. Pat. No. 6,181,490 (Wun et al.) discloses an adjustable optical frame used for a prism in an optical combiner application in which a prism is enclosed within a complex sheet metal frame that provides multiple constraints on prism movement and expansion and has numerous adjustments;

U.S. Pat. No. 3,848,973 (Merz et al.) discloses a prism holder for use in a light deflection system, in which a compression assembly is employed;

U.S. Pat. No. 4,571,028 (Ziegler et al.) discloses a prism mount for a prism enclosed in a tube, which would not be well-suited to a high-heat environment due to containment of the prism;

U.S. Pat. No. 5,749,641 (Brice et al.) discloses a color combiner or separator prism enclosed on five sides within a complex frame structure having multiple sections, with some frame sections used to support mounting of other optical components;

U.S. Pat. No. 6,141,150 (Ushiyama et al.) discloses a dichroic prism mounting method using oversized components, requiring complex alignment procedures and presenting demanding adhesive requirements; and U.S. Pat. No. 6,010,221 (Maki et al.) discloses a prism mount for a projection apparatus, using a diecast holding member that surrounds the prism in an arrangement that would not be optimal for high heat applications and may over-constrain the prism.

As a rule of thumb, the literature for prism mounting generally recommends using a kinematic configuration, such as mechanical compression, as is discussed in *Handbook of Optomechanical Engineering*, Anees Ahmad, Editor, CRC Press, New York, N.Y., 1997, pp. 202–210. However, attempts to provide suitable prism mounting using spring forces, frames, or other mechanical constraints have proved inadequate to the task of providing a stable mount for a color separating prism in a high brightness projection apparatus, primarily due to thermal expansion and the need for cooling. Moreover, any type of mechanical device that applies a constraint or preloading force can obstruct the light path, thereby reducing the available brightness. When mounting a V-prism in the illumination path as a color separator, for example, it is necessary to allow, as far as possible, an unobstructed light path at multiple faces of the prism. In general, it is desirable to minimize the size of a color separator prism while, at the same time, maximizing its effective area for light propagation. Because a V-prism or other type of color separator prism is fabricated as an assembly of glued prism components, mounting schemes should minimize, equalize, or eliminate mechanical stress on glued seams. Unwanted stress birefringence can also occur due to constraining forces applied against any prism surface. These same heat and mounting stress considerations that apply for color separator prisms may also apply for color-combining prisms that combine separate monochrome color modulation paths to form a color output beam for projection, and for prisms used to separate or combine light paths in other applications.

Thus it can be seen that there is a need for a prism mounting apparatus and method that is particularly well suited for use with a color separator prism or color combiner prism in a high-energy illumination subsystem of an electronic color projection apparatus.

SUMMARY OF THE INVENTION

It is an object of the present invention to provide an apparatus and method for mounting a color separator prism in the illumination path of an electronic color projection apparatus, without requiring a mechanical preload, thereby minimizing or eliminating mechanical stress. With this object in mind, the present invention provides a mounting bracket for suspending a clear aperture of the base face of a prism, the mounting bracket comprising:

(a) a frame providing a horizontal support surface;

(b) a first, a second, and a third support element spaced apart on the frame for supporting the base face of the prism, suspending the clear aperture of the prism thereby, the second and third support elements being peripheral to the clear aperture; and wherein the center of gravity of the prism, vertically projected, lies on or within the triangle formed by the first, second, and third support elements.

From another aspect, the present invention provides a mounting bracket for suspending a clear aperture of the base of a prism over an opening, the mounting bracket comprising:

(a) a frame providing a horizontal support surface and defining the opening for allowing light to pass through the clear aperture;

(b) a first, a second, and a third support element spaced apart on the frame for supporting the base face of the prism, suspending the clear aperture on the base of the prism over the opening thereby, wherein the second and third support elements are peripheral to the opening and wherein the center of gravity of the prism, vertically projected, lies on or within the triangle formed by the first, second, and third support elements.

It is a feature of the present invention that it provides a three-point suspension mounting on a single glass section of a V-prism in one embodiment, so that the mount mechanism does not introduce stress to adhesively joined sections.

It is an advantage of the present invention that it provides minimal obstruction to air flow for cooling the prism.

It is a further advantage of the present invention that elements of a single-piece mounting bracket is in contact with the prism, thus minimizing mechanical effects due to thermal expansion. The apparatus and method of the present invention provide a non-kinematic mounting solution that is structurally robust and neither imposes mechanical constraints, nor exerts forces such as axial or shear loads upon the prism. The single-piece mounting bracket of the present invention is capable of supporting the weight of a color separator prism sized for the illumination requirements of a large-scale electronic projection apparatus.

It is a further advantage of the present invention that it provides a mounting solution that does not stress glass seams within the prism.

It is yet a further advantage of the present invention that it allows straightforward fixturing of a prism into a stable mounting position.

It is a further advantage of the present invention that it provides a solution for suspension mounting of a prism that is relatively low-cost.

It is a yet further advantage of the present invention that it provides a lens mounting scheme that allows for uniform thermal expansion.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1$b$ is a perspective view identifying clear apertures of a color separator prism of the V-prism design;

FIG. 3$b$ is a perspective view showing vertical projection of the center of gravity relative to mounting pads, using the method of the present invention;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

As is shown in FIG. 1$a$, color separator prism 30 has multiple light-transmitting portions. These "optically active" areas are termed the "clear apertures" of the prism. Referring to FIG. 1$b$, each of the clear apertures of color separator prism 30 is represented in dotted outline. White light along axis O enters at an input clear aperture AO and is separated into a blue light that exits along axis $O_b$ at a blue clear aperture Ab, a green light that exits along axis $O_g$ at green clear aperture Ag, and a red light that exits along axis $O_r$ at red clear aperture Ar. In order to provide the maximum brightness in each color channel, the ideal mounting solution for color separator prism 30 keeps each of these clear apertures AO, Ab, Ar, and Ag unobstructed. Of particular interest for the purposes of the present invention is red clear aperture Ar at the base of color separator prism 30. The mounting solution of the present invention keeps red clear aperture Ar unobstructed while, at the same time, supporting color separator prism 30 in a stable mounting arrangement.

Figure 1A:
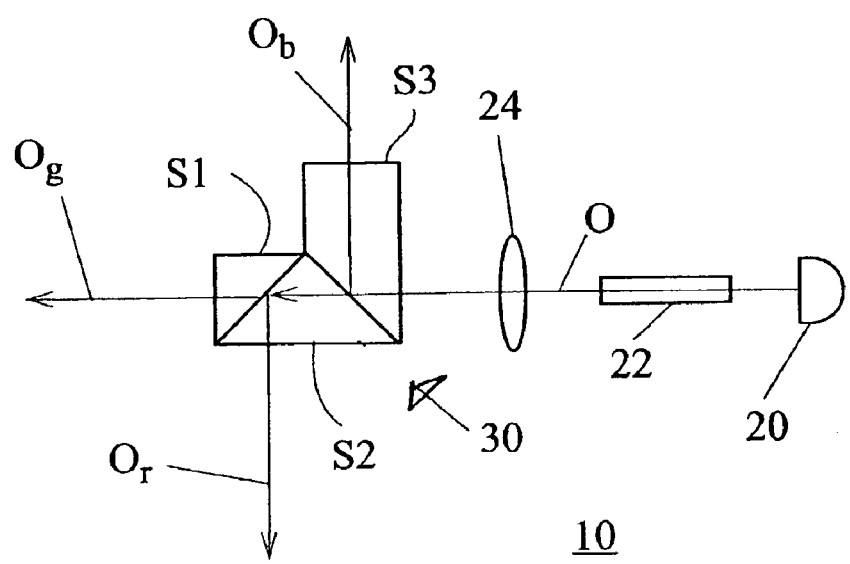
FIG. 1$a$ is a schematic block diagram showing the basic components of the illumination path in an electronic projection apparatus.
Figure 1B:
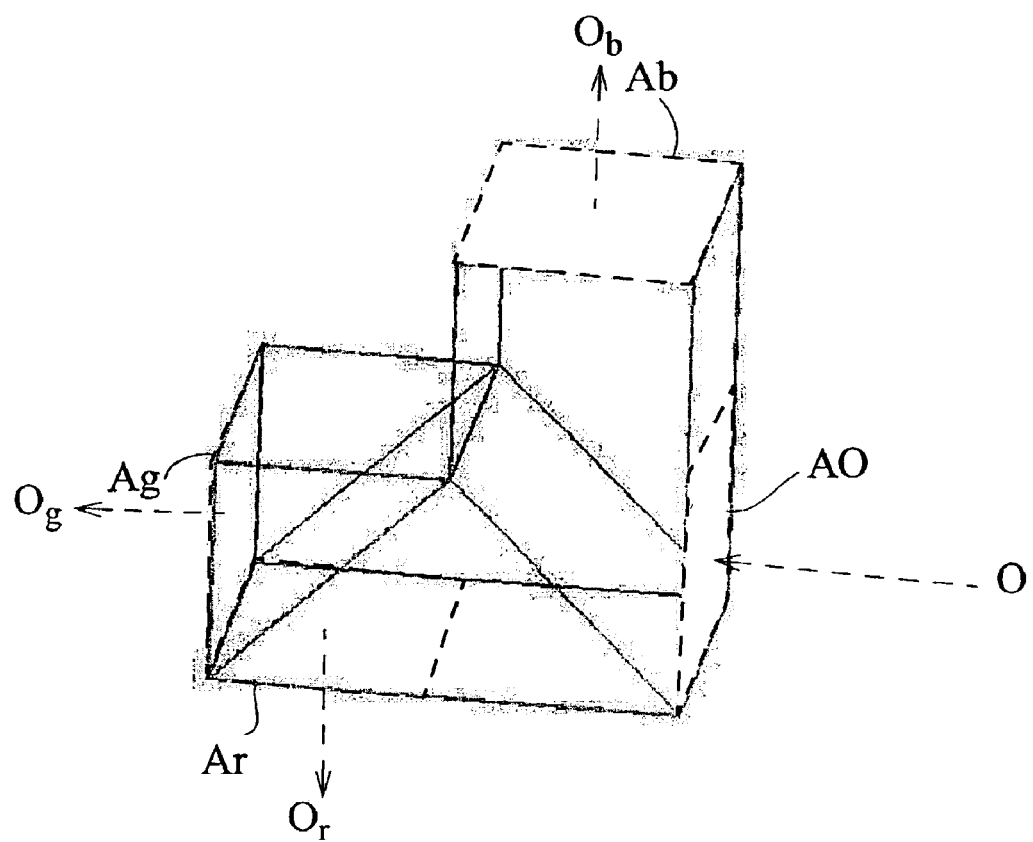
Figure 2:
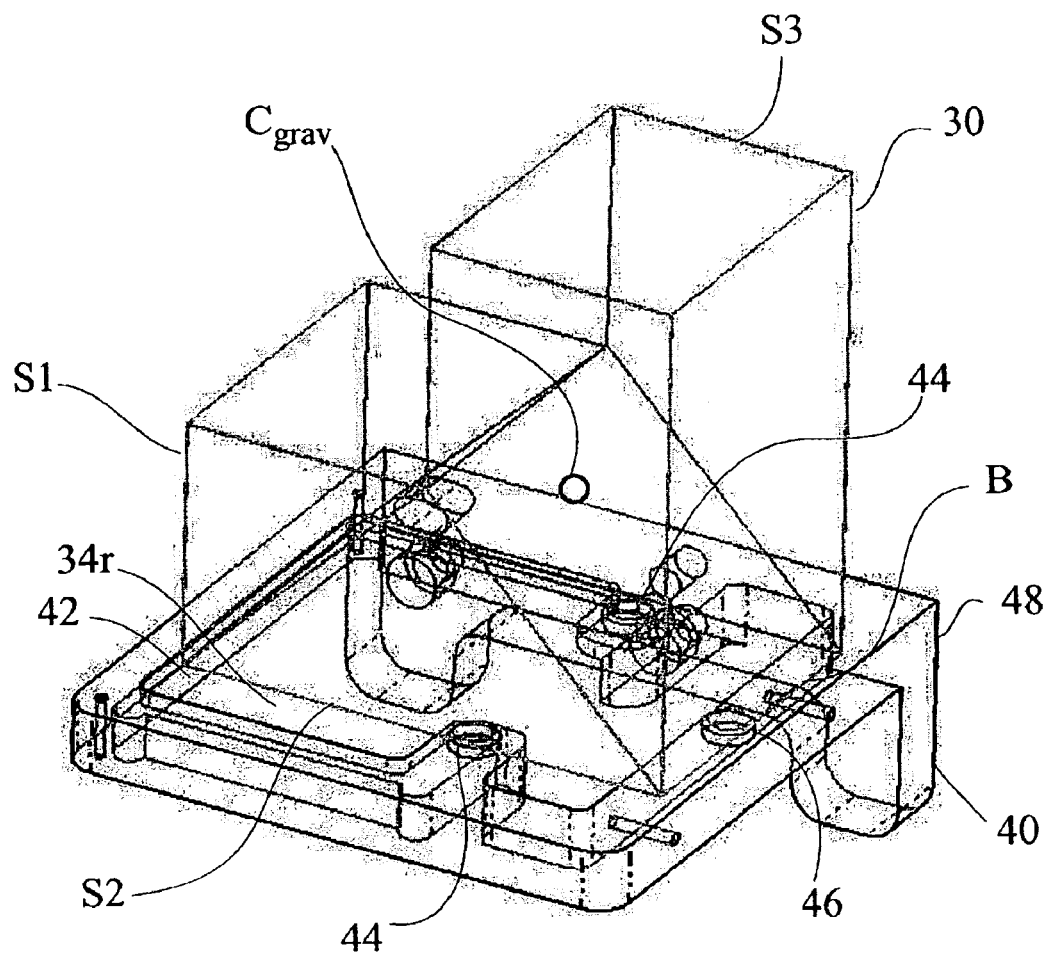
FIG. 2 is a perspective view showing a prism mount according to the present invention.
Figure 3A:
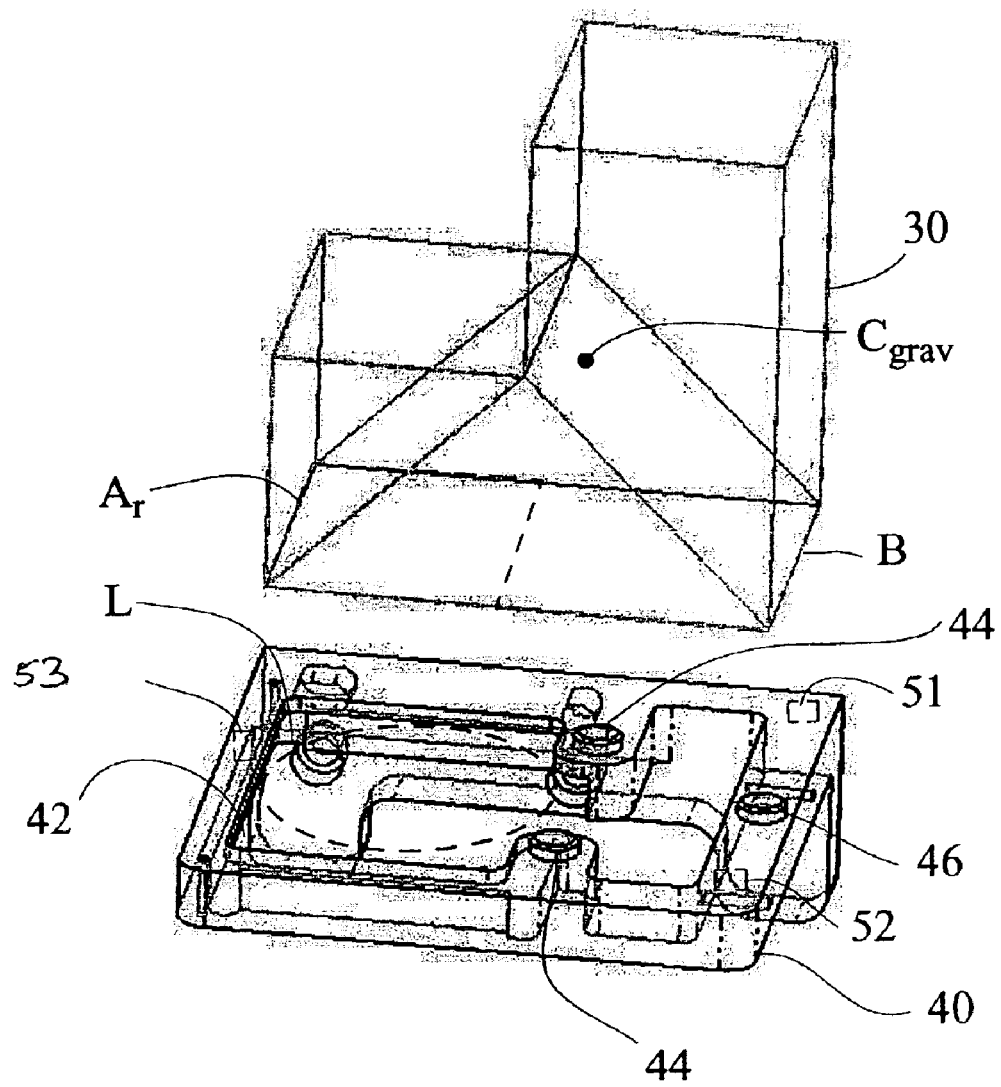
FIG. 3$a$ is a perspective exploded view showing the mounting bracket with the prism vertically displaced.
Figure 3B:
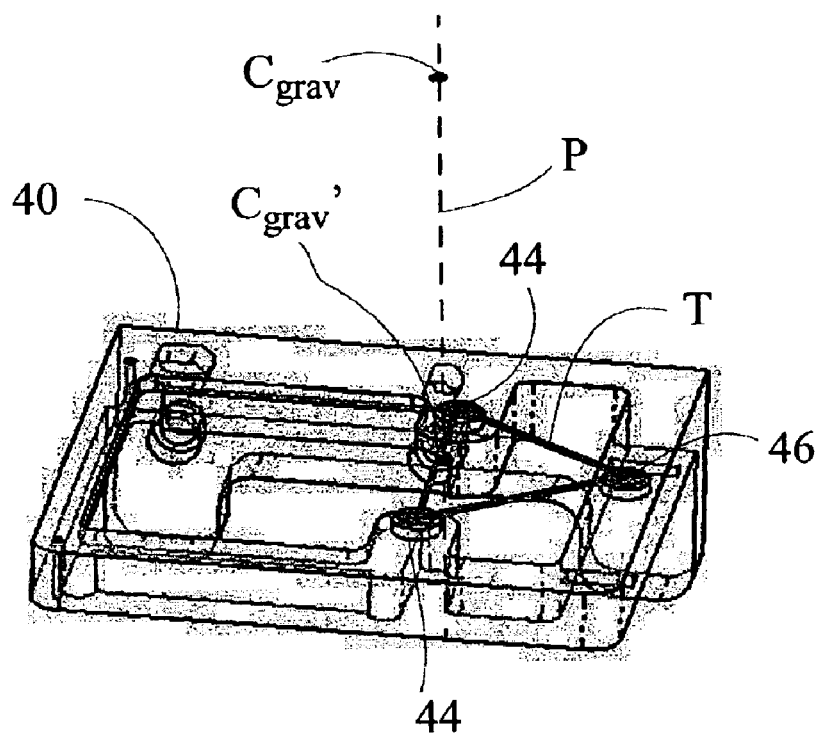

Referring to FIGS. 2 and 3a, there is shown a mounting bracket 40 for suspension mounting of color separator prism 30, a V-prism in a preferred embodiment, on its base face B. Mounting bracket 40 provides a horizontal support surface and frames an opening 42 that allows an unobstructed light path through the red clear aperture Ar, that is, through the light-transmitting portion, of base B of color separator prism 30. As is shown by the cross-section of light cone L in FIG. 3a, indicated by dotted lines, the unobstructed light path is through a portion of opening 42 in the embodiment shown. Light cone L is represented as generally circular in FIG. 3a; in practice, however, light cone L can have the cross-sectional shape of a rounded rectangle. At a minimum, opening 42 should allow passage of light from light cone L into the clear aperture Ar or "working portion" of base B of color separator prism 30. With the V-prism of the preferred embodiment, the clear aperture Ar of base B of color separator prism 30 is that portion of base B that lies below prism segment S1, as shown in FIGS. 1a, 1b, and 2. Opening 42 can be expanded further, beyond the area needed for light cone L, as is shown most clearly in FIG. 3a, to allow more substantial air flow from below color separator prism 30 when in its suspended mounting position. A three-point seating is provided for base B of color separator prism 30, with two rear mounting pads 44 and a front mounting pad 46 serving as support elements. For stable suspension of color separator prism 30, allowing for some thermal expansion without imposing over-constraint, rear mounting pads 44 can be substantially aligned with the center of gravity $C_{grav}$ of color separator prism 30, as shown in FIGS. 3a and 3b.

Because the structure of color separator 30 is essentially homogeneous, the center of gravity $C_{grav}$ coincides with its centroid of volume. For homogeneous 3-dimensional devices in general, using conventional x, y, and z axis coordinates, the center of gravity $C_{grav}$ is the point $(\overline{X}, \overline{Y}, \overline{Z})$ where each coordinate is found by solving for the following, respectively:

$$\overline{X}\Sigma V = \Sigma \overline{x} V,$$

$$\overline{Y}\Sigma V = \Sigma \overline{y} V,$$

$$\overline{Z}\Sigma V = \Sigma \overline{z} V,$$

where V represents the volume. With the V-prism used as color separator prism 30 in FIGS. 2 and 3a, its three planes of symmetry intersect at the centroid of its volume, that is, at the center of gravity $C_{grav}$. Methods for computing the center of gravity for a homogeneous structure are well known in the mechanical arts and can be found in standard engineering texts.

For stable suspension of color separator prism 30 over opening 42, rear mounting pads 44 and front mounting pad 46 must be properly positioned with respect to the center of gravity $C_{grav}$ of color separator prism 30. Referring to FIG. 3b, there is shown how this relationship is defined. Front and rear mounting pads 46 and 44 define a triangle T along the horizontal surface defined by mounting bracket 40. The vertical projection of center of gravity $C_{grav}$ of color separator prism 30 must lie on or within the bounds of triangle T. Otherwise, the mounting for prism 30 would be unstable and cause stress at adhesion points on front and rear mounting pads 46 and 44. In a preferred embodiment, center of gravity $C_{grav}$ of color separator prism 30 lies on the line between rear mounting pads 44; this arrangement maximizes the relative allowable size of the clear aperture of color separator prism 30 that is suspended over opening 42.

It is instructive to note that, given a V-prism configuration for color separator prism 30 and its arrangement within mounting bracket 40 as shown in FIGS. 2 and 3a, conventional design practices would suggest using mounting pads or elements located at alternative mount points 51, 52, and 53, as labeled in FIG. 3a. However, it can be seen that providing a mounting feature at alternative mount point 53 requires either of two compromises: (i) enlargement of color separator prism 30 or (ii) partial obstruction of light cone L. By design, however, color separator prism 30, is designed to equalize optical path lengths for each color; thus, enlarging one leg of color separator prism 30 requires compensatory resizing of other components, adding bulk and weight. Obstruction of light cone L has undesirable effects, reducing the light available through opening 42 and therefore through the clear aperture of color separator prism 30 for the corresponding color path (the red light path in the embodiment of FIG. 1a). While an additional mounting feature at 50 may reduce sensitivity to vibration and lift, the need for such additional support is minimized by careful alignment of rear mounting pads 44 with respect to the center of gravity $C_{grav}$ of color separator prism 30, as was described with respect to FIG. 3b.

When seated as shown in FIG. 2, color separator prism 30 is adhesively fixed to mounting pads 44 and 46. This three-point seating arrangement, following the rule for positioning mounting pads 44 and 46 relative to center of gravity $C_{grav}$ of color separator prism 30, thus provides sufficient mechanical constraint for color separator prism 30, without redundancy and without the need for an adjustment or alignment mechanism integrated into mounting bracket 40. In a preferred embodiment, an adhesive of an epoxy type is used for front mounting pad 46 adhesion, while a more flexible adhesive, such as an adhesive of an RTV type, is used for both rear mounting pads. Use of this combination of adhesives allows fixing contact firmly at front mounting pad 46 while allowing some slight flexibility for attachment at rear mounting points 44, minimizing over-constraint at adhesion points, thereby minimizing or eliminating a possible cause of stress birefringence. Other adhesive types and combinations of adhesive types could be employed for adhesively fixing color separator prism 30 to mounting pads 44 and 46, as is well known in the opto-mechanical arts.

To support the mass of color separator prism 30, which can easily weigh more than 1 lb. (0.5 kg or more), mounting bracket 40 must be structurally robust. In a preferred embodiment, mounting bracket 40 is a single piece of cast or machined aluminum. By comparison, prior art solutions using sheet metal structures, such as those disclosed in U.S. Pat. No. 5,749,641, for example, would require additional support features in order to adequately handle the weight requirement for color separator prism 30. Additionally, sheet metal frame structures could be subject to objectionable levels of thermal shift.

Front and rear mounting pads 44 and 46 are stainless steel pads in a preferred embodiment. Alternately, one or more mounting pads 44 or 46 could be an integral structural feature, cast as part of or machined into mounting bracket 40.

Unlike prior art solutions that house a prism within a frame, mounting bracket 40 allows unobstructed air flow over and around the surface of color separator prism 30, with a minimum of obstruction of air flow at base B of mounting bracket 40 due to opening 42. With this arrangement, potential hot-spots are eliminated or minimized.

Figure 4:
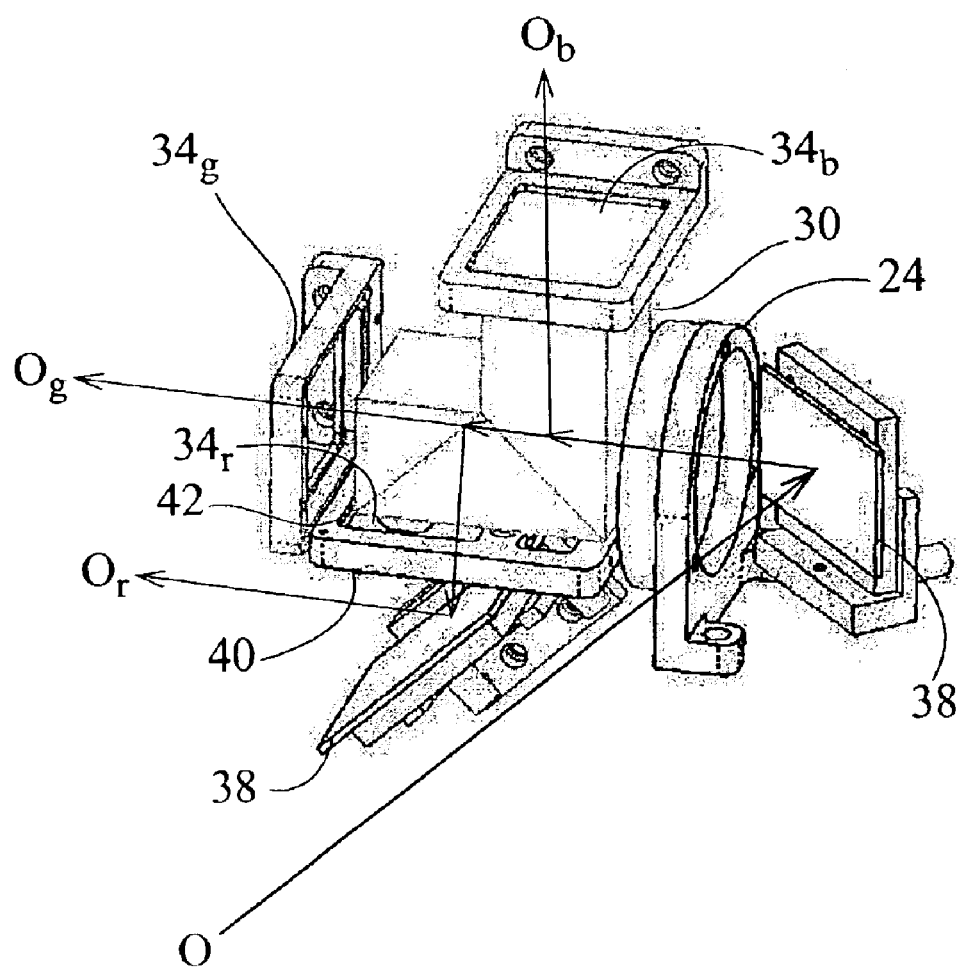
FIG. 4 is a perspective view showing the prism mount of the present invention in an arrangement with color filters and other supporting components in an illumination path.

Mounting bracket 40 provides a generally vertical mounting surface 48 for attachment to a chassis structure within the color projection apparatus. Referring to FIG. 4, there is shown a compact arrangement of supporting optical components in a projection apparatus using mounting bracket 40. Optical axis designations are the same as were shown in FIGS. 1a and 1b. White light, provided along optical axis O, is directed through lens 24 toward color separator prism 30 by a mirror 38. Color separator prism 30 provides blue light along axis Ob, upward in the configuration of FIG. 4. A blue color filter 34b is provided for improving the spectral characteristics of the blue light that has been reflected from an internal dichroic surface (not shown) within color separator 30 and out Ob. Green light is provided along axis Og, to the left in the configuration shown in FIG. 3. A green color filter 34g conditions the green light output along Og. Red light is provided along axis Or, downward in the configuration of FIG. 3, and is redirected by mirror 38. A red color filter 34r is provided for the red illumination path; red color filter 34r is supported within-opening 42 of mounting bracket 40, as is also shown in FIG. 2.

Unlike conventional, complex sheet metal mounts having multiple adjustments and constraints, single-piece mounting bracket 40 provides a gravity-assisted three-point mount. A three point mount allows a minimum of contact between color separator prism 30 and its mounting bracket 40, yet still provides a highly stable support arrangement. With the non-kinematic mounting solution provided by mounting bracket 40, there are no external loading forces applied to color separator prism 30, so that there is minimum stress on glued surfaces within color separator prism 30. Advantageously, the use of a V-prism as color separator prism 30 places all three mounting pads 44 and 46 in contact with a single glass surface (the base of section S2, as shown in FIG. 2), causing no counteracting stresses on glued prism surfaces.

Alignment of Color Separator Prism 30

Using mounting bracket 40 of the present invention, color separator prism 30 does not require sensitive adjustments or alignment for seating and adhesion. Notably, no datum surface for color separator prism 30 alignment need be provided within mounting bracket 40 itself. Using conventional methods, a vertical datum surface or datum points could be provided on mounting bracket 40, aligned with or parallel to mounting surface 48 as shown in FIG. 2. Color separator prism 30 would then be aligned against such a datum surface during assembly into mounting bracket 40. It can be appreciated by those skilled in the opto-mechanical arts that a built-in datum surface, such as would be conventionally provided, introduces additional constraints, possibly causing asymmetric thermal expansion, and may introduce added mechanical stresses to color separator prism 30 glued surfaces.

External fixturing can be provided for precision mounting of color separator prism 30 within mounting bracket 40 in a straightforward manner, simplifying mechanical alignment during adhesive curing time, for example. In a conventional fixturing scheme, mounting bracket 40 is temporarily mounted to a surface provided by the fixture. Then, color separator 30 is aligned in position on mounting bracket 40, using mechanical datum points provided by the fixture, employing alignment techniques well known in the optical component assembly art.

Figure 7:
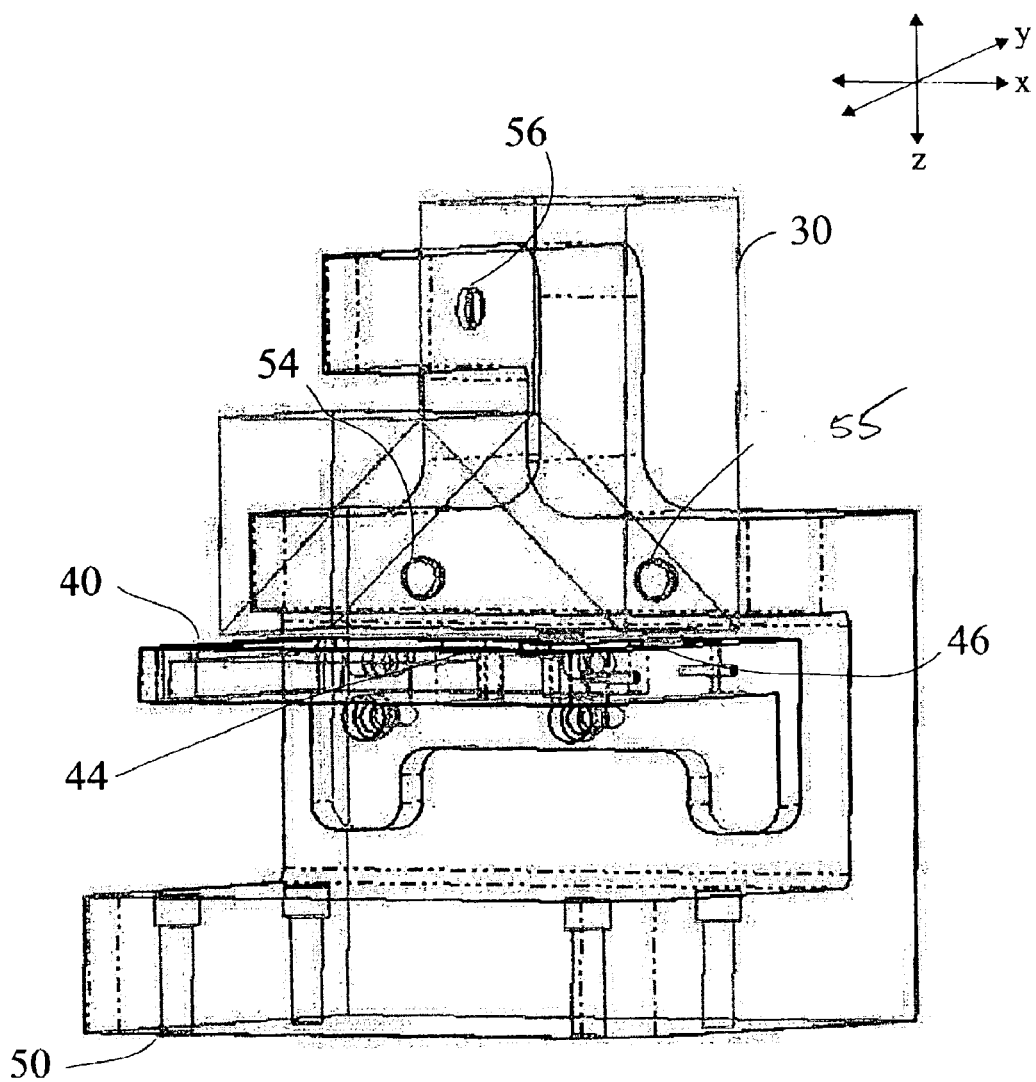
FIG. 7 is a perspective view showing a fixture for prism alignment within the mounting bracket of the present invention.

FIG. 7 shows one example of an alignment fixture 50 for use with mounting bracket 40. Mounting fixture 40 is itself attached to alignment fixture 50 during alignment and curing. Using the reference set of x, y, z coordinate axes shown in FIG. 7, datum points 54 and 55 fix the position of color separator prism 30 in the y-direction. Datum point 56 then fixes the position of color separator prism 30 in the x-direction. Mounting pads 44 and 46, on mounting bracket 40 itself, fix the position of color separator prism in the z-direction. It can be readily appreciated that it would be possible to build datum points 54 and 55 into mounting bracket 40 if desired.

Use of Additional Support Elements

Figure 5:
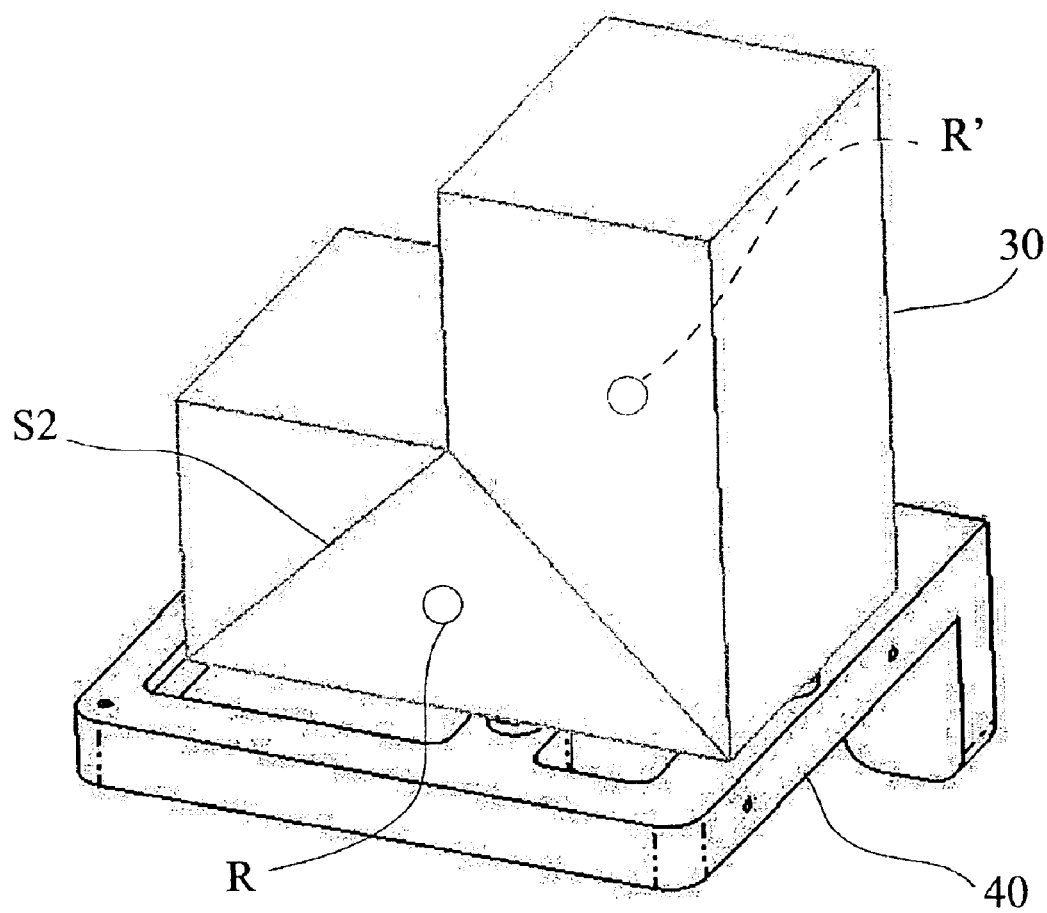
FIG. 5 is a perspective view showing one of a pair of possible locations on the prism where supplemental support may be applied without over-constraint.

As noted in the background section above, conventional design practices suggest prism mounting using kinematic techniques. The apparatus and methods of the present invention provide prism mounting with minimal constraints and unobstructed light paths for input white light and output monochromatic light; however, additional elements can be added to mounting bracket 40 in some cases, without obstructing the light path and without adding constraints that are unduly excessive. For example, where vibration levels pose a problem or a high degree of portability is needed for a projection apparatus using mounting bracket 40, the application of additional support forces may be justified, even if this risks some slight amount of overconstraint. Referring to FIG. 5, there is shown one optional contact point area R, which would be paired with a corresponding, symmetric point area R' (shown dotted) on the opposite face of color separating prism 30. Applying a slight amount of kinematic force between point areas R and R' may provide additional stability, without obstructing the light paths. As FIG. 5 indicates, the best position for point areas R and R' would be at the center of prism segment S2. Alternate points of contact could be used; however, the best arrangement for minimizing stress on glued joints of color separator prism 30 would be to use contact points on prism segment S2 only, for a V-prism in the configuration shown. At the points of contact, a flexible adhesive such as an adhesive of an RTV type can be used. (Direct metal-to-glass contact at both point areas R and R' would not be recommended.) It must be emphasized that use of the optional contact point areas R and R' shown in FIG. 5 is described by way of example only; other conventional methods could be used to add stability to the prism mount when required by the application. Additional support must be designed according to the specific loads applied, within the elastic region of the constraint. Key principles that should be followed in any case include maintaining unobstructed clear apertures for color separator prism 30, maximizing open space around color separator prism 30 to allow air flow for cooling, and minimizing undue stress upon color separator prism 30.

It can be seen that the apparatus and method of the present invention provide, for color separator prism 30, a suspension mounting solution that allows prism 30 to have minimum size while, at the same time, providing maximum allowable light path for each clear aperture of the prism.

Alternative Embodiments

Figure 6:
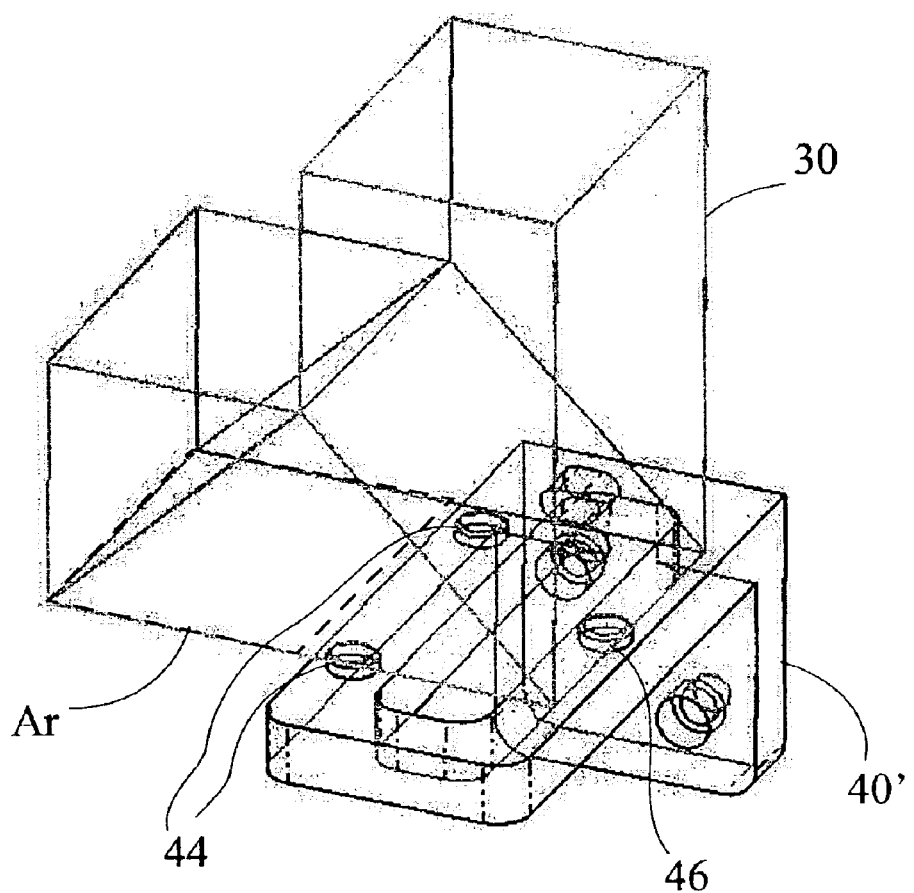
FIG. 6 is a perspective view showing a prism mount in another embodiment of the present invention.

In the embodiments of FIGS. 2, 3a, and 3b, mounting bracket 40 defines opening 42 for light passage through the suspended clear aperture of base B of color separator prism 30. As is noted hereinabove with reference to FIG. 4, it is advantageous for opening 42 to be defined in this way, since mounting bracket 40 conveniently provides a suitable housing for color filter 34r. However, in an alternative embodiment, the clear aperture Ar of base B of color separator prism 30 may be suspended without an opening 42 specifically defined. Referring to FIG. 6, there is shown an alternate mounting bracket 40' for suspension mounting of color separator prism 30 in this way. Using the same basic principles described with respect to the first embodiment of FIGS. 2 through 5, alternate mounting bracket 40' in FIG. 6 provides front and rear mounting pads 44 and 46 for seating color separator prism 30. The alternative configuration of FIG. 6 uses the same relationship of mounting pads 44 and 46 with the center of gravity $C_{grav}$ of color separator prism 30 that is described above with reference to FIG. 3*b*.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. While the embodiment described is for suspension mounting of a prism used as a color separator, the apparatus and method of the present invention could be more broadly applied to prism components in other applications, particularly where high-temperature conditions apply. For example, in some types of electronic color projector design, a color combining prism having the same overall V-structure of color separator prism 30 may be used. For a color combining prism, monochromatic and white light would travel in opposite directions from that shown in FIGS. 1*a* and 1*b*, with red, green, and blue light provided as input to the prism, and synthesized white light as output for projection.

Mounting bracket 40 allows the stable suspension of a prism over an opening while imposing minimal or no obstruction of light paths above, below, and to each side of the prism. Thus, mounting bracket 40 could be used with a wide range of prism designs in addition to the V prism configuration described hereinabove.

Thus, what is provided is an apparatus and method for suspension mounting of a prism within an electronic color projection system.

Parts List

10 Illumination apparatus
20 Light source
22 Uniformizing optics
24 Lens
30 Color separator prism
34*r* Color filter, red
34*g* Color filter, green
34*b* Color filter, blue
38 Mirror
40 Mounting bracket
40' Alternate mounting bracket
42 Opening
44 Rear mounting pads
46 Front mounting pad
48 Mounting surface
50 Alignment fixture
51 Alternative mount point
52 Alternative mount point
53 Alternative mount point
54 Datum points
55 Datum points
56 Datum points

What is claimed is:

1. A mounting bracket for suspending a clear aperture of a base face of a prism, said mounting bracket comprising:

(a) a frame providing a horizontal support surface;
   (b) a first, a second, and a third support element spaced apart on said frame for supporting said base face of the prism, suspending said clear aperture of said prism thereby, said second and third support elements being peripheral to said clear aperture; and wherein a center of gravity of said prism, vertically projected, lies on or within a triangle formed by said first, second, and third support elements.

2. A mounting bracket according to claim 1 wherein said prism is adhesively affixed to said frame on at least one of said first, second, and third support elements.

3. A mounting bracket according to claim 1 wherein said prism is a color separator.

4. A mounting bracket according to claim 2 wherein said prism is adhesively affixed using an adhesive taken from the set consisting of an epoxy type adhesive and an RTV type adhesive.

5. A mounting bracket according to claim 1 wherein said first support element comprises a mounting pad.

6. A mounting bracket according to claim 1 wherein said frame is aluminum.

7. A mounting bracket according to claim 1 wherein at least one of said first, second, or third support elements is an integral structural feature of said frame.

8. A mounting bracket according to claim 1 wherein at least one of said first, second, or third support elements is stainless steel.

9. A mounting bracket according to claim 1 wherein said light is monochromatic.

10. A mounting bracket according to claim 1 wherein no additional support elements are provided for the prism.

11. A mounting bracket according to claim 1 wherein the prism is a color combiner.

12. A mounting bracket according to claim 1 wherein the prism is a V-prism.

13. A mounting bracket according to claim 1 further comprising mechanical support in contact with at least one face of the prism.

14. A mounting bracket according to claim 1 further comprising mechanical support applied between opposite faces of the prism.

15. A mounting bracket according to claim 1 further comprising at least one alignment datum contacting a side face of the prism.

16. A mounting bracket according to claim 1 wherein the prism is fabricated from a plurality of glued segments.

17. A mounting bracket according to claim 1 wherein said frame defines an opening for light through said clear aperture.

* * * * *